United States Patent
Bednarek et al.

(10) Patent No.: US 11,454,207 B2
(45) Date of Patent: Sep. 27, 2022

(54) WIND TURBINE AND METHOD FOR ASSEMBLING A WIND TURBINE

(71) Applicant: Siemens Gamesa Renewable Energy A/S, Brande (DK)

(72) Inventors: Jakub Bednarek, Brande (DK); Christian Laursen, Hedensted (DK); Peder Bach, Juelsminde (DK); Prashant Tukaram Deokar, Ikast (DK); Kim Gade Nielsen, Herning (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 117 days.

(21) Appl. No.: 16/767,253

(22) PCT Filed: Oct. 17, 2018

(86) PCT No.: PCT/EP2018/078353
§ 371 (c)(1),
(2) Date: May 27, 2020

(87) PCT Pub. No.: WO2019/110180
PCT Pub. Date: Jun. 13, 2019

(65) Prior Publication Data
US 2020/0355156 A1 Nov. 12, 2020

(30) Foreign Application Priority Data
Dec. 4, 2017 (EP) .................................. 17205064

(51) Int. Cl.
*F03D 1/06* (2006.01)
*F03D 13/10* (2016.01)

(52) U.S. Cl.
CPC ........... *F03D 1/0658* (2013.01); *F03D 13/10* (2016.05); *F03D 1/0675* (2013.01);
(Continued)

(58) Field of Classification Search
None
See application file for complete search history.

(56) References Cited

U.S. PATENT DOCUMENTS 6,568,712 B1 * 5/2003 Aaron, III .......... B23K 37/0533
285/24
9,518,563 B2 * 12/2016 Ollgaard ................. E04F 19/00
(Continued)

FOREIGN PATENT DOCUMENTS

CN 2828366 Y 10/2006
CN 201448183 U 5/2010
(Continued)

OTHER PUBLICATIONS

Japanese Office Action dated May 24, 2021 for JP Pat. Appl. No. 2020-530300.
(Continued)

*Primary Examiner* — Courtney D Heinle
*Assistant Examiner* — Jason Fountain
(74) *Attorney, Agent, or Firm* — Schmeiser, Olsen & Watts LLP

(57) ABSTRACT

A wind turbine and a method for assembling a wind turbine is disclosed. The wind turbine, including a first portion, a second portion which is connectable to the first portion, and a spring element which is connected to the first portion and which protrudes therefrom, wherein the spring element configured to guide the second portion towards the first portion and, and wherein the spring element is configured to be deformed while the second portion is guided towards the first portion. Assembly operations are simplified since an elastic guiding system is provided which reduces movements between portions to be connected. In particular, a duration of assembly operations may be reduced.

13 Claims, 4 Drawing Sheets

(52) U.S. Cl.
CPC ... *F05B 2230/604* (2013.01); *F05B 2240/912* (2013.01); *F05B 2260/79* (2013.01)

(56) References Cited

U.S. PATENT DOCUMENTS

| | | | | |
|---|---|---|---|---|
| 9,599,093 | B2* | 3/2017 | Bitsch | F03D 13/10 |
| 9,651,019 | B2* | 5/2017 | Moeller | G01B 5/25 |
| 9,777,704 | B2* | 10/2017 | Minadeo | F03D 1/0658 |
| 10,704,535 | B2* | 7/2020 | Christensen | E04H 12/342 |
| 2009/0211174 | A1* | 8/2009 | Henderson | F03D 13/40 |
| | | | | 52/40 |
| 2010/0228205 | A1 | 9/2010 | Hu et al. | |
| 2012/0076663 | A1 | 3/2012 | From | |
| 2013/0236316 | A1* | 9/2013 | Bitsch | F03D 13/10 |
| | | | | 416/204 R |
| 2015/0260167 | A1* | 9/2015 | Stege | F16B 17/004 |
| | | | | 403/14 |
| 2015/0285225 | A1* | 10/2015 | Ollgaard | E04H 12/342 |
| | | | | 52/745.18 |
| 2016/0040649 | A1 | 2/2016 | Smith et al. | |
| 2016/0084220 | A1* | 3/2016 | Moeller | F03D 13/10 |
| | | | | 33/533 |
| 2016/0123306 | A1* | 5/2016 | Minadeo | F03D 80/70 |
| | | | | 416/174 |
| 2016/0348650 | A1* | 12/2016 | Moeller | F03D 13/20 |
| 2019/0170125 | A1* | 6/2019 | Nielsen | F03D 13/20 |
| 2019/0277259 | A1* | 9/2019 | Christensen | E04H 12/342 |

FOREIGN PATENT DOCUMENTS

| | | |
|---|---|---|
| CN | 101994641 A | 3/2011 |
| CN | 201874748 U | 6/2011 |
| CN | 201908790 U | 7/2011 |
| CN | 102146881 A | 8/2011 |
| CN | 202047948 U | 11/2011 |
| CN | 102418678 A | 4/2012 |
| CN | 102762849 A | 10/2012 |
| CN | 102782311 A | 11/2012 |
| CN | 103016271 A | 4/2013 |
| CN | 103047095 A | 4/2013 |
| CN | 103527421 A | 1/2014 |
| CN | 104819101 A | 8/2015 |
| CN | 104912749 A | 9/2015 |
| CN | 204805037 U | 11/2015 |
| CN | 205190125 U | 4/2016 |
| CN | 205297833 U | 6/2016 |
| CN | 108590950 A | 9/2018 |
| EP | 2748460 A1 | 7/2014 |
| EP | 2998569 A1 | 3/2016 |
| EP | 2526288 B1 | 6/2017 |
| WO | 2011018747 A2 | 2/2011 |
| WO | 2011088835 A2 | 7/2011 |
| WO | WO 2011110254 A2 | 9/2011 |
| WO | WO 2012034564 A1 | 3/2012 |
| WO | WO2013027048 A1 | 2/2013 |
| WO | WO 2014075687 A1 | 5/2014 |

OTHER PUBLICATIONS

Indian Office Action dated Mar. 26, 2021 for Application No. 202017022174.
PCT International Search Report dated Jan. 17, 2019 corresponding to PCT International Application No. PCT/EP2018/078423 filed Oct. 17, 2018.
Written Opinion dated Jan. 17, 2019 corresponding to PCT International Application No. PCT/EP2018/078423 filed Oct. 17, 2018.
Hua, Liu et al: "Research on Dymanics Modeling and Simulation Method of Drive Train for Mega-watts Wind Turbine"; Dngfang Turbine; No. 2, Year: Jun. 25, 2016, pp. 51-63.

\* cited by examiner

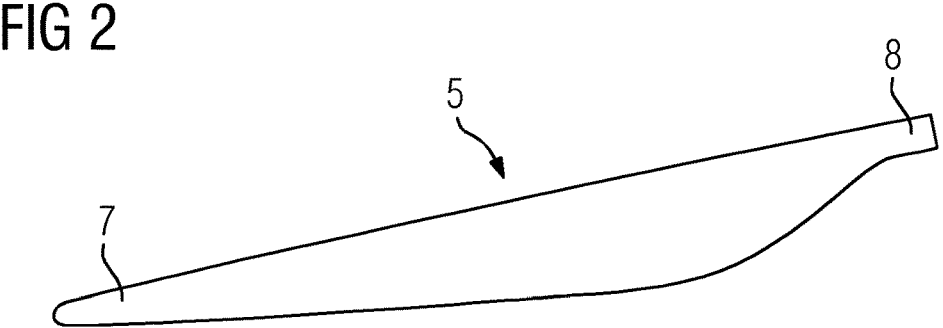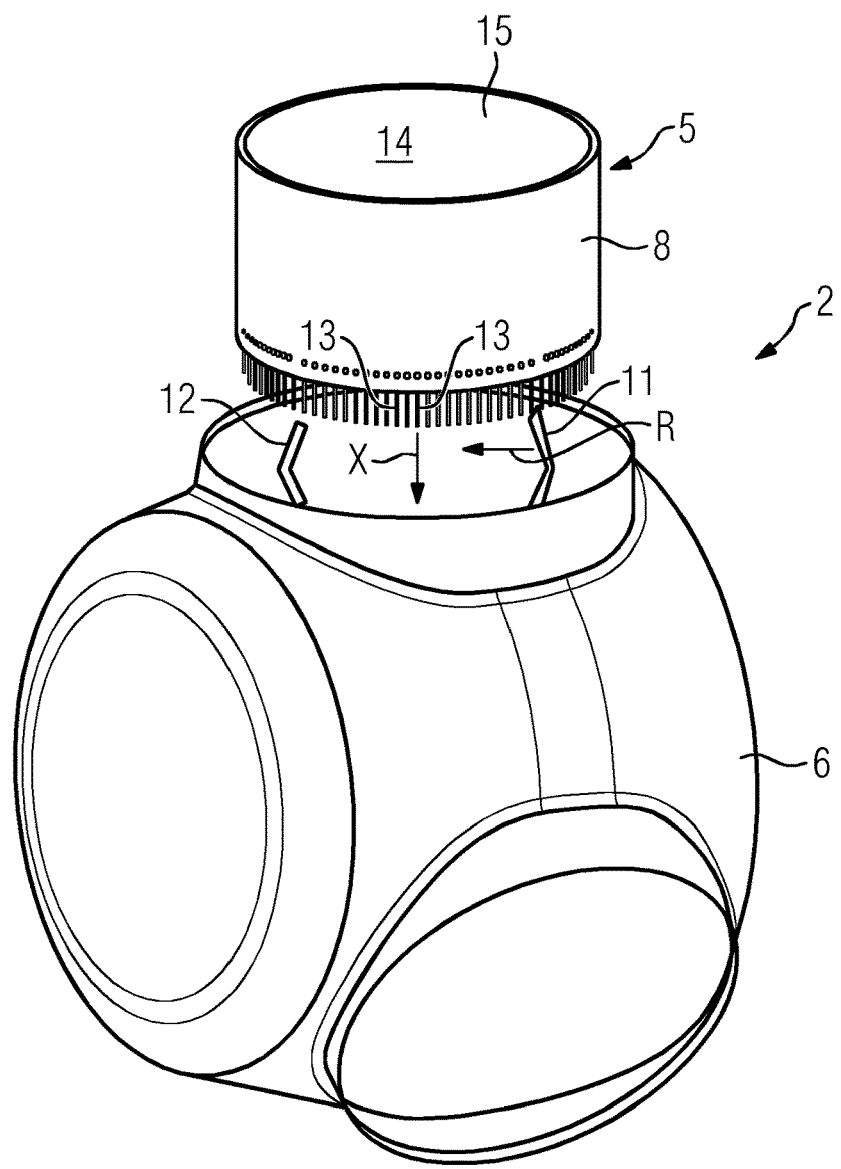

WIND TURBINE AND METHOD FOR ASSEMBLING A WIND TURBINE

CROSS-REFERENCE TO RELATED APPLICATIONS

This application claims priority to PCT Application No. PCT/EP2018/078353, having a filing date of Oct. 17, 2018, which is based on European Application No. 17205064.3, having a filing date of Dec. 4, 2017, the entire contents both of which are hereby incorporated by reference.

FIELD OF TECHNOLOGY

The following relates to wind turbine and a method for assembling the wind turbine.

BACKGROUND

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. The rotor blade is connected to the hub by means of a pitch bearing that allows a pitch movement of the rotor blade. The pitch bearing normally is a rolling element bearing. A longer rotor blade experiences more forces of the wind that interacts with the rotor blade. The forces are transferred over the pitch bearing of the rotor blade to the hub.

When assembling a wind turbine, in particular connecting the blade to hub, e.g. one scenario is that bolts or guiding pins needs to penetrate holes which e.g. have just a few millimeters (mm) of clearance. Such an operation may be difficult since for example it is performed on site in heights of e.g. 50 to 150 meters (m). Such operations may be more difficult due to the movements which will inevitably be present at respective heights. These movements may have a magnitude between 50 and 500 mm.

SUMMARY

An aspect relates to an improved wind turbine.

Accordingly, a wind turbine is provided. The wind turbine comprises a first portion, a second portion which is connectable, in particular connected, to the first portion, and a spring element which is connected to the first portion and which protrudes therefrom, wherein the spring element is configured to guide the second portion towards the first portion, and wherein the spring element is configured to be deformed while the second portion is guided towards the first portion.

The advantages of the wind turbine are the following. Assembly operations are simplified since an elastic guiding system is provided which reduces movements between portions to be connected. In particular, a duration of assembly operations may be reduced. Thus, costs may also be reduced. Further, stacks between the first portion and the second portion may be avoided since an early elastic connection between the first and the second portion is provided which prevents impulsive relative movements between the first and the second portion.

The spring element is configured to guide the second portion towards the first portion while the second portion is moved towards the first portion for connecting. The spring element is configured to be deformed merely elastically while the second portion is guided towards the first portion. The spring element interacts e.g. with an inner surface of a housing or an outer shell of the second portion during a guiding movement.

In particular, the second portion has a fitting direction towards the first portion, wherein the spring element is deformed or bended essentially perpendicular to the fitting direction while the second portion being guided towards the first portion.

In the connected status of the first and the second portion the spring element protrudes in an inner space of the second portion. In particular, in the connected status of the first and the second portion the spring element is elastically pretensioned e.g. perpendicular to the fitting direction and/or e.g. to a radial direction.

"Wind turbine" presently refers to an apparatus converting the wind's kinetic energy into rotational energy, which may again be converted to electrical energy by the apparatus. According to an embodiment, the spring element protrudes at least 0.5 m, 1 m, 2 m or 3 m from the first portion.

This has the advantage that fitting the spring element into the inner space of the second portion may be performed at a respective distance between the first and the second portion. Additionally or alternatively, the spring element may protrude at least 0.5 m, 1 m, 2 m or 3 m from a connection interface to the first portion. Such a connection interface e.g. may be provided at a flange of the first portion.

According to a further embodiment, the first portion has a mass of at least 1 ton, 5 tons, 10 tons, 50 tons, 100 tons or 1500 tons and/or the second portion has a mass of at least 1 ton, 5 tons, 10 tons, 50 tons, 100 tons or 1500 tons.

This has the advantage that heavy portions may by connected easily and with a reduced expenditure of time. In particular, the mass of the first portion may be between 10 to 1500 tons and/or the mass of the second portion may be between 10 to 1500 tons.

According to a further embodiment, the spring element is made of metal, in particular steel or aluminum, or plastic material, in particular rubber.

In particular, the steel may be a spring steel. This has the advantage that enough elasticity may be provided and that a stiff behavior which may cause brittle failure may be avoided.

According to a further embodiment, the wind turbine comprises stiff guiding elements connected to the first portion or the second portion and protruding therefrom.

This has the advantage that additionally a stiff guiding of the second portion may be executed. In particular, the stiff guiding elements are guiding pins or bolts. Holes corresponding to the stiff guiding elements are provided at the first portion or the second portion.

According to a further embodiment, the stiff guiding elements protrude less than 0.5 m, 0.25 m, 0.15 m or 0.1 m from the first portion or the second portion.

This has the advantage that in a first step the second portion is guided towards the first portion by means of an elastic guide (spring element) having a long reach and in a second step the second portion is guided towards the first portion additionally or merely by means of a stiff guiding (stiff guiding elements and corresponding holes) having a short reach. Thus, accurate connection of the first portion and the second portion is possible.

According to a further embodiment, the wind turbine comprises a further spring element which is connected to the first portion and which protrudes therefrom, wherein the further spring element is configured to guide the second portion towards the first portion and is configured to be deformed while the second portion is guided towards the first portion.

This has the advantage that a well-defined guiding movement of the second portion relative to the first portion may be executed. The spring element is a first spring element and the further spring element is a second spring element. In particular, three, four or five, identical, spring elements are provided. The spring elements may be identical.

According to a further embodiment, the first portion is a hub and the second portion is a blade.

This has the advantage that a mounting process of the blade to the hub may be improved.

According to a further embodiment, the first portion is a tower section, a nacelle section, a generator, a hub section or a blade section and the second portion is a tower section, a nacelle section, a generator, a hub section or a blade section.

According to a further embodiment, the spring element comprises a first spring portion and a second spring portion, wherein an angle between the first spring portion and the second spring portion is between 100° and 170°, 110° and 160°, 120° and 150° or 130° and 140°.

Thus, elastic bending between the first spring portion and the second spring portion is facilitated. The further spring element is identical to the spring element. In particular, the spring element and the further spring element are arranged opposite to each other, wherein the first spring portion of the spring element and a first spring portion of the further spring element are bended towards each other such that a tapered guide is provided.

According to a further embodiment, the spring element comprises a connecting portion which is arranged between the first spring portion and the second spring portion and which connects the first spring portion to the second spring portion, wherein the connecting portion contacts the second portion.

In particular, the connecting portion may be a buckled portion or a corner portion of the spring element, wherein the first and the second spring portions may be provided as straight beam portions.

Further, a method for assembling a wind turbine, in particular such a wind turbine blade, is provided. The method comprises the steps: a) providing a first portion, a second portion and a spring element which is connected to the first portion and which protrudes therefrom, b) guiding the second portion towards the first portion by means of the spring element, wherein the spring element is deformed while guiding the second portion towards first portion, and c) connecting the second portion to the first portion.

The embodiments and features described with reference to the apparatus of the present invention apply mutatis mutandis to the method of embodiments of the present invention.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein:

FIG. 2 shows a perspective view of a wind turbine blade of the wind turbine according to FIG. 1;

FIG. 3 shows a perspective partial view of a rotor of the wind turbine according to FIG. 1.

DETAILED DESCRIPTION

Figure 1:
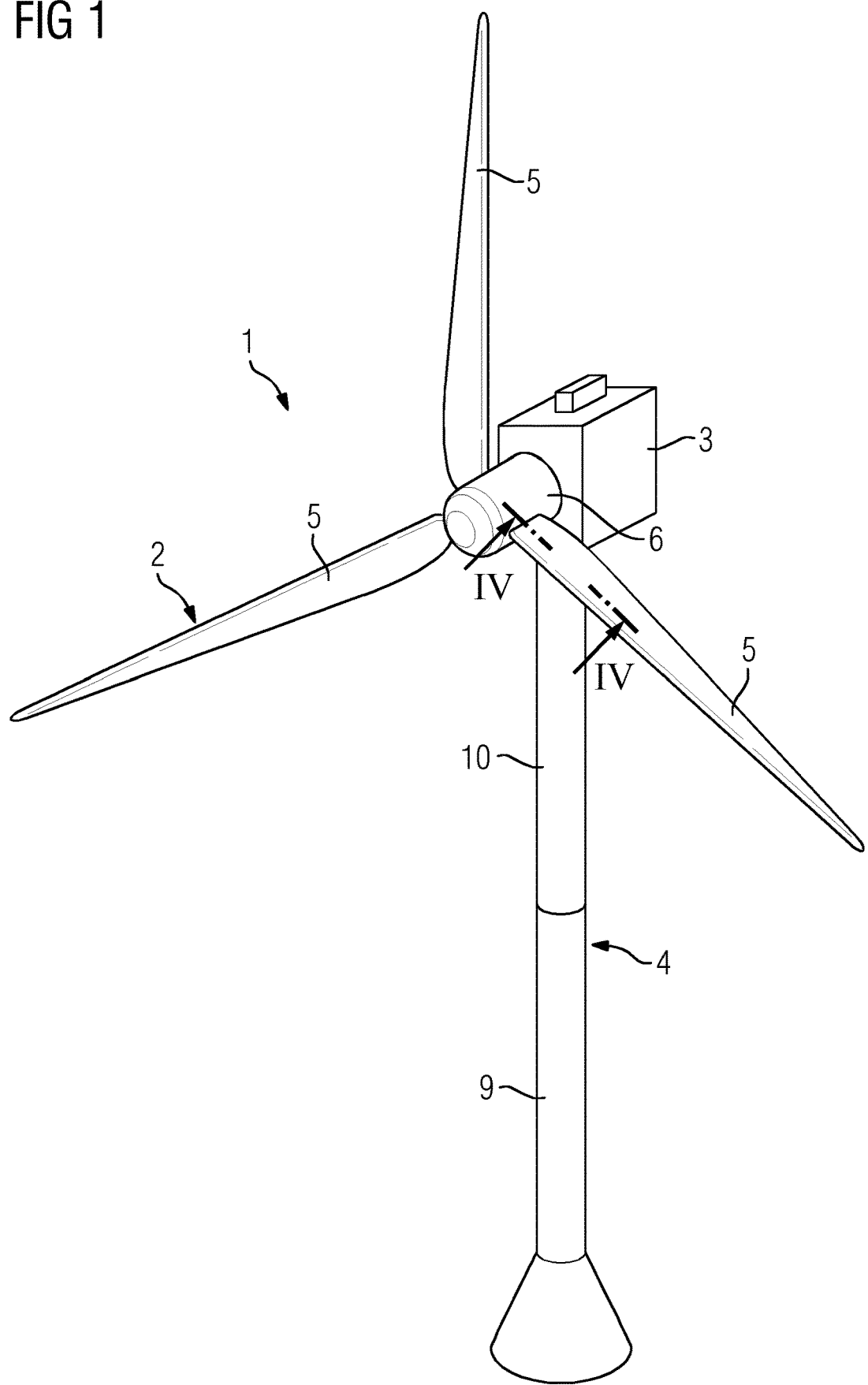
FIG. 1 shows a perspective view of a wind turbine according to one embodiment.

FIG. 1 shows a wind turbine 1. The wind turbine 1 comprises a rotor 2 connected to a generator (not shown) arranged inside a nacelle 3. The nacelle 3 is arranged at the upper end of a tower 4 of the wind turbine 1. The tower 4 may comprise a first tower section 9 and a second tower section 10 which is connected to the first tower section 9.

The rotor 2 comprises three rotor blades 5. The rotor blades 5 are connected to a hub 6 of the wind turbine 1. Rotors 2 of this kind may have diameters ranging from, for example, 30 to 200 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. Therein, glass fibers are generally better than carbon fibers for cost reasons. Oftentimes, glass fibers in the form of unidirectional fiber mats are used.

FIG. 2 shows a rotor blade 5. The rotor blade 5 comprises an aerodynamically designed portion 7 which is shaped for optimum exploitation of the wind energy and a blade root 8 for connecting the rotor blade 5 to the hub 6.

FIG. 3 shows a perspective partial view of the rotor 2 of the wind turbine 1. Accordingly, a first portion and a second portion which is connectable to the first portion is provided. The first portion may have a mass of at least 1 ton, 5 tons, 10 tons, 50 tons, 100 tons or 1500 tons. The second portion may have a mass of at least 1 ton, 5 tons, 10 tons, 50 tons, 100 tons or 1500 tons.

In this case the first portion is the hub 6 and the second portion is the blade 5. Further, a spring element 11 and a further spring element 12 which are connected to the hub 6 are provided. The spring elements 11, 12 protrude from the hub 6, wherein the spring elements 11, 12 are configured to guide the blade 5 towards the hub 6, and wherein the spring elements 11, 12 are configured to be deformed while the blade 5 is guided towards the hub 6.

The spring elements 11, 12 may be made of metal, in particular steel or aluminum, or plastic material, in particular rubber. Furthermore, the wind turbine 1 comprises stiff guiding elements 13 connected to the blade root 8 and protruding there-from. In particular, the stiff guiding elements 13 are guiding pins or bolts. The stiff guiding elements 13 protrude less than 0.5 m, 0.25 m, 0.15 m or 0.1 m from the blade root 8. The hub 6 comprises holes (not shown) corresponding to the guiding elements 13. The holes and the guiding elements 13 are configured to form a form-fit connection.

When the blade 5 is moved towards the hub 6 in a fitting direction X during an assembly process, first the spring elements 11, 12 engage into an inner space 14 of the blade root 8 which is surrounded by an inner surface 15 of the blade root 8. Then, the blade 5 may be guided towards the hub 6 in fitting direction X by means of the spring elements 11, 12. During guiding of the blade 5 the spring elements 11, 12 are deformed and/or bent to a radially inner direction R which is perpendicular to the fitting direction X.

Alternatively, the first portion may be a tower section 9, 10, a nacelle section, a generator, a hub section or a blade section 8 and the second portion may be a tower section 9, 10, a nacelle section, a generator, a hub section or a blade section 8.

Figure 4:
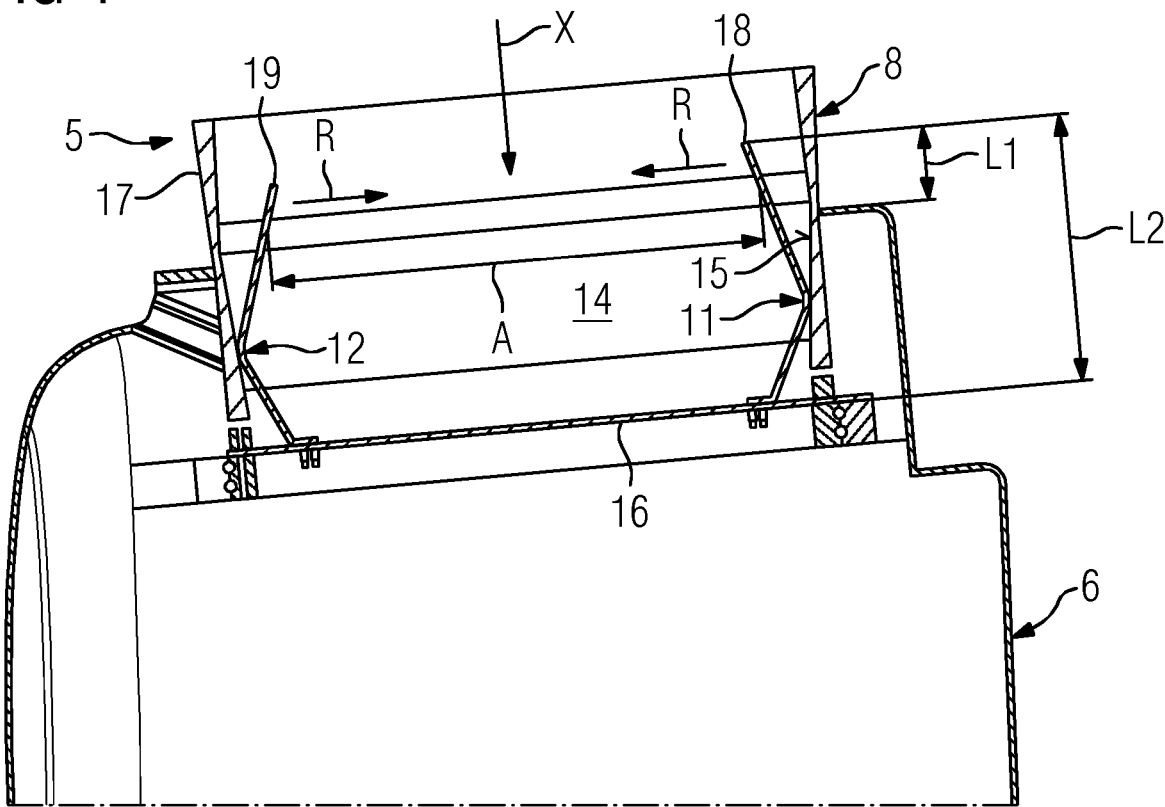
FIG. 4 shows a cross-sectional view IV-IV of FIG. 1.

FIG. 4 shows a cross-sectional view IV-IV of FIG. 1. The spring elements 11, 12 are connected, in particular by means of bolts, to a flange 16 of the hub 6. The spring elements 11, 12 protrude by a length L1 from the hub 6. The length L1 may be at least 0.2, 0.3, 0.4, 0.5 m, 1 m, 2 m or 3 m. The spring elements 11, 12 further protrude from the flange 16 by a length L2. The length L2 may be at least 0.5 m, 1 m, 2 m, 3 m or 4 m.

The blade 5 further comprises a housing or outer shell 17 having the inner surface 15. The spring elements 11, 12 are pushed to a respective radially inner direction R by the inner surface 15 and are pretensioned against the respective radially inner direction R. A distance A between the first and the second spring element 11, 12 starting from ends 18, 19 of the spring elements 11, 12 increases in fitting direction X. Thus, fitting the spring elements 11, 12 to the inner space 14 is facilitated and the effectiveness of guiding increases in fitting direction X.

Figure 5:
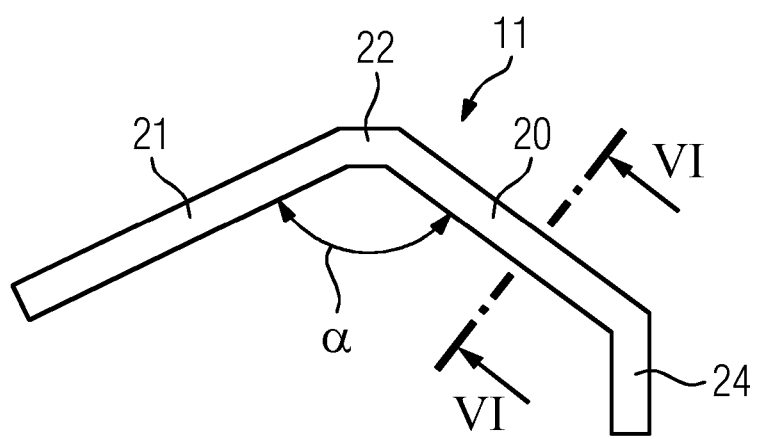
FIG. 5 shows a side view of a spring element of the wind turbine according to FIG. 1.

FIG. 5 shows a side view of the spring element 11. The spring element 11 comprises a first spring portion 20 and a second spring portion 21. An angle α between the first spring portion 20 and the second spring portion 21 is between 100° and 170°, 110° and 160°, 120° and 150° or 130° and 140°.

Further, the spring element 11 comprises a connecting portion 22 which is arranged between the first spring portion 20 and the second spring portion 21 and which connects the first spring portion 20 to the second spring portion 21. The connecting portion 22 contacts for example the inner surface 15 (see FIG. 4).

The connecting portion 22 may be a buckled portion or a corner portion of the spring element 11. The first and the second spring portions 21, 22 may be provided as straight beam portions. Moreover, a flange portion 24 is provided to be connected to the flange 16 (see FIG. 4). The portions 20, 21, 22, 24 may be provided as one piece element.

Figure 6:
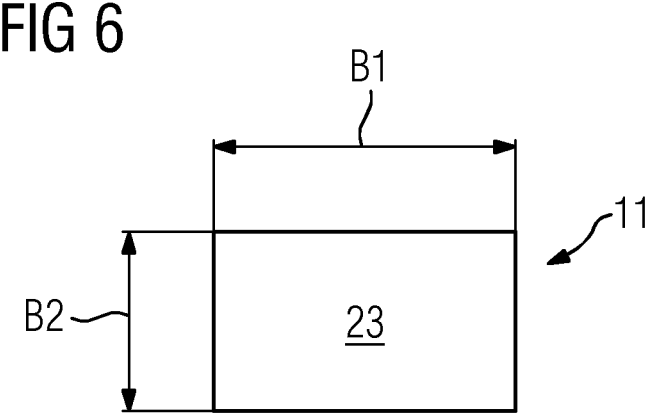
FIG. 6 shows a cross-sectional view VI-VI of FIG. 5.

FIG. 6 shows a cross-sectional view VI-VI of the spring element 11, in particular of the first spring portion 20. A cross-section 23 of the spring element 11 may have an essentially rectangular shape. A length B1 of the cross section 23 may be smaller than a width B2 of the cross-section 23. Width B2 may be less than 75%, 50% or 25% of length B1. Thus, bending of the spring element 11 around the width B2 efforts relatively small forces such that deformation is facilitated.

It is understood that all features mentioned with regard to the first spring element 11 also may be provided with regard to the second spring element 12.

Figure 7:
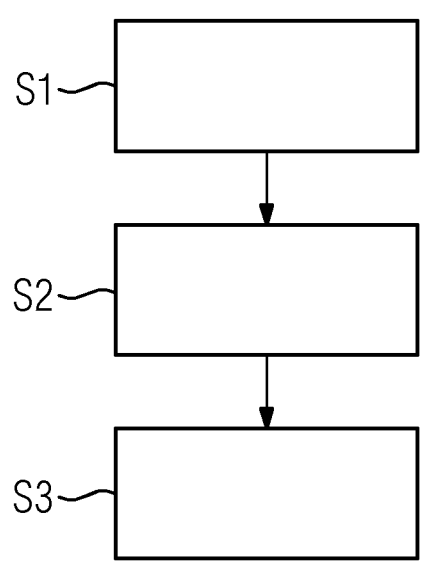
FIG. 7 shows a schematic block diagram of a method for assembling a wind turbine.

FIG. 7 shows a schematic block diagram of a method for assembling the wind turbine 1.

In a step S1 a first portion, a second portion and a spring element 11, 12 which is connected to the first portion and which protrudes therefrom is provided. In a step S2 the second portion is guided towards the first portion by means of the spring element 11, 12, wherein the spring element 11, 12 is deformed while guiding the second portion towards first portion.

The step S2 comprises a first step of guiding the second portion towards the first portion by means of an elastic guide (spring element 11, 12) having a long reach and a second step of guiding the second portion towards the first portion additionally or merely by means of a stiff guiding (stiff guiding elements and corresponding holes) having a short reach.

In a step S3 the second portion is connected and fixed to the first portion.

It is understood that all features explained for the wind turbine 1 regarding FIG. 1 to FIG. 6 are also provided for the method of FIG. 7.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A wind turbine, comprising:
   a first portion,
   a second portion which is connectable to the first portion, and
   a plurality of spring elements which are connected to the first portion and which protrude therefrom, wherein the plurality of spring elements are configured to guide the second portion towards the first portion, and wherein the plurality of spring elements are configured to be deformed while the second portion is guided in a fitting direction towards the first portion, wherein the plurality of spring elements are configured to be deformed in a radial inner direction perpendicular to the fitting direction,
   wherein each spring element of the plurality of spring elements comprises a first spring portion and a second spring portion and wherein respective second spring portions are pushed in the radial inner direction when the plurality of spring elements are deformed in the radial inner direction such that a distance between respective second spring portions increases in the fitting direction.

2. The wind turbine according to claim 1, wherein the plurality of spring elements protrude at least 0.5 m, 1 m, 2 m or 3 m from the first portion.

3. The wind turbine according to claim 1, wherein at least one of the first portion has a mass of at least 1 ton, 5 tons, 10 tons, 50 tons, 100 tons or 1500 tons; and the second portion has a mass of at least 1 ton, 5 tons, 10 tons, 50 tons, 100 tons or 1500 tons.

4. The wind turbine according to claim 1, wherein the spring element is made of metal or plastic material.

5. The wind turbine according to claim 4, wherein the metal is steel or aluminum.

6. The wind turbine according to claim 4, wherein the plastic material is rubber.

7. The wind turbine according to claim 1, further comprising stiff guiding elements connected to the first portion or the second portion and protruding therefrom.

8. The wind turbine according to claim 1, further comprising stiff guiding elements connected to the first portion or the second portion and protruding therefrom, wherein the stiff guiding elements protrude less than 0.5 m from the first portion or the second portion, and wherein the plurality of spring elements protrude at least 0.5 m from the first portion.

9. The wind turbine according to claim 1, wherein the first portion is a hub and the second portion is a blade.

10. The wind turbine according to claim 1, wherein the first portion is a tower section, a nacelle section, a generator, a hub section or a blade section and the second portion is a tower section, a nacelle section, a generator, a hub section or a blade section.

11. The wind turbine according to claim 1, wherein an angle between the first spring portion and the second spring portion is between 100° and 170°, 110° and 160°, 120° and 150° or 130° and 140°.

12. The wind turbine according to claim 11, wherein at least one spring element comprises a connecting portion which is arranged between the first spring portion and the second spring portion and which connects the first spring portion to the second spring portion, wherein the connecting portion contacts the second portion when the first portion and the second portion are connected, and wherein the second spring portion does not contact the second portion when the first portion and the second portion are connected.

13. A method for assembling a wind turbine, comprising the steps:

a) providing a first portion, a second portion and a plurality of spring elements which are connected to the first portion and which protrude therefrom, b) guiding the second portion towards the first portion by the plurality of spring elements, wherein guiding the second portion towards the first portion includes movement in a fitting direction, wherein the plurality of spring elements are deformed perpendicular to the fitting direction while guiding the second portion towards first portion, and c) connecting the second portion to the first portion, wherein each spring element of the plurality of spring elements comprises a first spring portion and a second spring portion, and wherein respective second spring portions are pushed in a radial inner direction when the second portion is connected to the first portion such that a distance between respective second spring portions increases in the fitting direction.

* * * * *